United States Patent
Blanchet et al.

(10) Patent No.: US 11,113,789 B2
(45) Date of Patent: Sep. 7, 2021

(54) METHOD AND DEVICE FOR DIGITAL IMAGE RESTORATION

(71) Applicant: Centre National d'Études Spatiales, Paris (FR)

(72) Inventors: Gwendoline Blanchet, Montauban (FR); Jean-Marc Delvit, Toulouse (FR); Christophe Latry, Toulouse (FR); Carole Thiebaut, Castanet-Tolosan (FR); Roberto Camarero, Muret (FR)

(73) Assignee: CENTRE NATIONAL D'ÉTUDES SPATIALES, Paris (FR)

( * ) Notice: Subject to any disclaimer, the term of this patent is extended or adjusted under 35 U.S.C. 154(b) by 39 days.

(21) Appl. No.: 16/347,518

(22) PCT Filed: Nov. 3, 2017

(86) PCT No.: PCT/EP2017/078237
§ 371 (c)(1),
(2) Date: May 3, 2019

(87) PCT Pub. No.: WO2018/083266
PCT Pub. Date: May 11, 2018

(65) Prior Publication Data
US 2019/0287221 A1    Sep. 19, 2019

(30) Foreign Application Priority Data
Nov. 4, 2016  (FR) .................................... 1660704

(51) Int. Cl.
*G06T 5/00*    (2006.01)
*G06T 5/10*    (2006.01)
(Continued)

(52) U.S. Cl.
CPC ............... *G06T 5/002* (2013.01); *G06T 5/10* (2013.01); *G06T 5/50* (2013.01); *G06T 9/00* (2013.01);
(Continued)

(58) Field of Classification Search
CPC .. G06T 5/002; G06T 9/00; G06T 5/10; G06T 5/50; G06T 2207/20182; G06T 2207/10036; G06T 2207/20221
See application file for complete search history.

(56) References Cited

U.S. PATENT DOCUMENTS

2005/0259889 A1    11/2005  Ferrari et al.
2015/0030237 A1*   1/2015   Jancsary ............. G06K 9/6282
                                                          382/159

FOREIGN PATENT DOCUMENTS

FR    3025640 A1    3/2016

OTHER PUBLICATIONS

Latry et al, "Restoration Technique for PLEIADES-HR Panchromatic Images", 2012 (Year: 2012).*

(Continued)

*Primary Examiner* — Ruiping Li
(74) *Attorney, Agent, or Firm* — Cantor Colburn LLP

(57) ABSTRACT

The invention concerns a method and a device for digital image restoration. The digital image to be restored comes from an initial image acquired by an image acquisition device having an associated acquisition instrumental noise. The method comprises the following steps: —obtaining (30) an intermediate digital image with restoration of the acquisition instrumental noise, —denoising (32) the intermediate digital image in order to obtain a denoised intermediate digital image, —deconvolution (34) of the denoised digital image in order to obtain a restored digital image.

16 Claims, 3 Drawing Sheets

(51) Int. Cl.
G06T 5/50 (2006.01)
G06T 9/00 (2006.01)
(52) U.S. Cl.
CPC ............... *G06T 2207/10036* (2013.01); *G06T 2207/20182* (2013.01); *G06T 2207/20221* (2013.01)

(56) References Cited

OTHER PUBLICATIONS

Dhérété et al, "Image De-blurring and Application to SPOT5 THR Satellite Imaging", 2003. (Year: 2003).*
English Machine Translation to Abstract FR3025640.
International Search Report for Application No. PCT/EP20171078237.
Written Opinion for Application No. PCT/EP2017/078237.

* cited by examiner

METHOD AND DEVICE FOR DIGITAL IMAGE RESTORATION

CROSS REFERENCE TO RELATED APPLICATIONS

This application is a National Stage of PCT Application No. PCT/EP2017/078237 filed on Nov. 3, 2017, which claims priority to French Patent Application No. 16/60704 filed on Nov. 4, 2016, the contents each of which are incorporated herein by reference thereto.

BACKGROUND

The present invention concerns a method for restoring a digital image from an initial image acquired by an image acquisition device having an associated acquisition instrumental noise, and then compressed by a predetermined compression method. It also concerns an associated restoration device.

The invention relates to the field of improving the quality of digital images.

Particularly, the invention aims at improving the quality of digital images having acquisition and compression noise. These images may be monospectral, multispectral, or hyperspectral.

Images compression is widely used, whether these consist of fixed images or digital videos.

The invention deals more particularly with the case of fixed images, acquired by any type of acquisition device.

The digital images are generally represented by image samples or pixels arrays, each image sample having a given dynamic radiometry value. A color image (multi or hyperspectral) is then represented by as many arrays as color components, each sample having a radiometry value for each color called spectral band.

In general, the compression methods comprise the application of three processings to a source digital image, which are the following ones: decorrelation, quantization, encoding. In several digital image compression standards, the decorrelation is obtained by applying a transformation, applied to the pixels to obtain transformed coefficients.

The JPEG («Joint Photography Expert Group») compression standard uses a discrete cosine transform (DCT) applied to 8×8-sized image blocks, followed by block quantization and entropy encoding.

The JPEG2000 compression standard was developed after JPEG. This standard uses a discrete wavelet transformation (DWT) of the source digital image. Quantization and encoding are performed in a single step, thanks to quality layer encoding, obtained by bitmap encoding of the transformed coefficients.

The various compression standards introduce, at a high compression ratio, visual artifacts, also called compression artifacts, which are structured, as they are related to the basic functions of the applied transformation. Such compression artifacts are, for example, block effects for JPEG and solid colors and butterfly patterns for compression methods using a wavelet transformation.

In the context of various applications, for example in the acquisition of satellite images, the images are acquired by an acquisition device, compressed by a given compression method and stored or transmitted to a remote device for a subsequent exploitation.

In the case of satellite imagery, the acquisition and compression of images are done on board a satellite, and the exploitation is done on the ground. In this case, the image is usually composed of a very spatially resolved panchromatic large band image and of n acquired images in much narrower spectral bands representing color multispectral information, the acquisition being performed with a sampling step k times larger than the sampling step of the panchromatic band, where k is generally 4. An image fusion method allows mixing the panchromatic image and the n multispectral images in order to obtain n color images at the panchromatic spatial resolution. The following description applies to both panchromatic and multispectral images.

Digital images comprise artifacts due to compression, whether they are panchromatic or multispectral images, blur as well as noise. Conventionally, a decompression, a restoration and a fusion of the images are performed, the restoration conventionally comprising a deconvolution followed by denoising.

In a known manner, the blur introduced by an acquisition device can be modeled by the convolution of the landscape observed by a characteristic function of the acquisition device, called impulse response, which represents the image of a point object. In an equivalent manner, this blur is reflected in the Fourier domain by the multiplication of the Fourier transform of the landscape by the Fourier transform of the impulse response, called the Modulation Transfer Function (MTF). The MTF characterizes the attenuation of the spatial frequencies by the instrument. The deconvolution of an image aims at compensating for this blur by convolution of the image with a filter called deconvolution filter, whose Fourier transform is close to the inverse of the MTF.

Artifacts may persist, in particular when the digital image to be restored comprises both noise and artifacts due to compression. Such artifacts are visually annoying to the users, and can hinder a further exploitation of the images, in particular on the merged product.

There is a need to improve the quality of the image restoration in this context, and more generally, the restoration of noisy images.

BRIEF SUMMARY

To this end, the invention provides a method for restoring a digital image, the digital image to be restored being derived from an initial image acquired by an image acquisition device having an associated acquisition instrumental noise. The method comprises the following steps of:
- obtaining an intermediate digital image with restitution of the acquisition instrumental noise,
- denoising the intermediate digital image to obtain a denoised intermediate digital image,
- deconvoluting the denoised intermediate digital image to obtain a restored digital image.

Advantageously, the method of the invention results in improving the quality of the images obtained after restoration, the restitution of acquisition instrumental noise allowing modifying the noise distribution in the digital images before restoration (denoising and deconvolution). In the case of images acquired by satellite, denoising is followed by deconvolution and fusion.

The method according to the invention may have one or more of the following features, considered in all technically acceptable combinations thereof.

The digital image to be restored has been obtained by applying a compression to the acquired initial image to obtain a compressed initial image, and then a decompression of the compressed initial image.

The restitution of the acquisition instrumental noise is performed in connection with the decompression of the compressed initial image.

The digital image to be restored is a multispectral image composed of a plurality of acquired images in different spectral bands and the steps of obtaining an intermediate digital image and of denoising the intermediate digital image are applied to each of the acquired images in different spectral bands, and the deconvolution step is applied to at least one of the intermediate digital images.

The method further includes an image fusion step applied after denoising or after deconvolution, to obtain a final restored image.

The acquisition instrumental noise is modeled by a model parameterized by two coefficients, the coefficients having values used during the restitution of instrumental noise, and the denoising step includes the application of a stabilization transformation of the variance parameterized by the two coefficients characterizing said parameterized model of the acquisition instrumental noise.

The digital image to be restored is a multispectral image composed of a plurality of acquired images in different spectral bands, and values of the coefficients of the acquisition instrumental noise model depending on the acquisition spectral band are determined for each acquisition spectral band.

The denoising step includes the following sub-steps of:
applying the variance stabilization transformation to obtain a stabilized intermediate image,
applying a stationary noise denoising method on the stabilized intermediate image,
applying an inverse transformation for stabilizing the variance on the digital image resulting from the step of applying a denoising method to obtain a denoised intermediate digital image.

In one embodiment, the variance stabilization transformation is an Anscombe transformation.

The step of obtaining an intermediate digital image comprises sub-steps of:
obtaining, by applying a transformation called compression transformation, a representation of the digital image to be restored by a plurality of coefficients blocks, each coefficients block corresponding to a pixels block of the digital image to be restored,
for at least one processed coefficient of a coefficients block:
calculating a noise threshold as a function of a value representative of the image acquisition instrumental noise model,
comparing the absolute value of said processed coefficient to the noise threshold, and,
when the absolute value of the processed coefficient is higher than or equal to said noise threshold, said coefficient is left unchanged,
when the absolute value of the processed coefficient is lower than said noise threshold, replacing the processed coefficient value with a noise value depending on said representative value of an image acquisition noise model.

The acquisition instrumental noise is modeled by a parameterized model defining the noise standard deviation $\sigma$ by $\sigma = \sqrt{a^2 + b \cdot s}$, where a and b are coefficients of said model and s is a coefficient value representative of an average of the values associated with the pixels of a pixels block of the considered digital image.

According to another aspect, the invention concerns a device for restoring a digital image, the digital image to be restored being derived from an initial image acquired by an image acquisition device having an associated acquisition instrumental noise. The device includes modules, implemented by a processor of a programmable device, adapted to:
obtain an intermediate digital image with restitution of the acquisition instrumental noise,
denoise the intermediate digital image to obtain a denoised intermediate digital image,
deconvolute the denoised intermediate digital image to obtain a restored digital image.

According to one embodiment, in which the digital image to be restored is a multispectral image composed of a plurality of acquired images in different spectral bands, the device further includes an image fusion module adapted to apply a fusion after denoising or after deconvolution, to obtain a final restored image.

According to another aspect, the invention concerns a computer program including software instructions which, when implemented by a programmable device, implement a method for restoring digital images as briefly described hereinabove.

BRIEF DESCRIPTION OF THE DRAWINGS

Other features and advantages of the invention will come out from the description given below, for indicative and non-limiting purpose, with reference to the appended figures, among which.

DETAILED DESCRIPTION

The invention is applied in particular in the context of satellite imagery, but is not limited to this field. It can also be applied to the restoration of any type of digital images presenting acquisition and compression noise.

The invention is applied to the processing of digital images. In the following description, the term «image» is used to designate a digital image.

Figure 1:
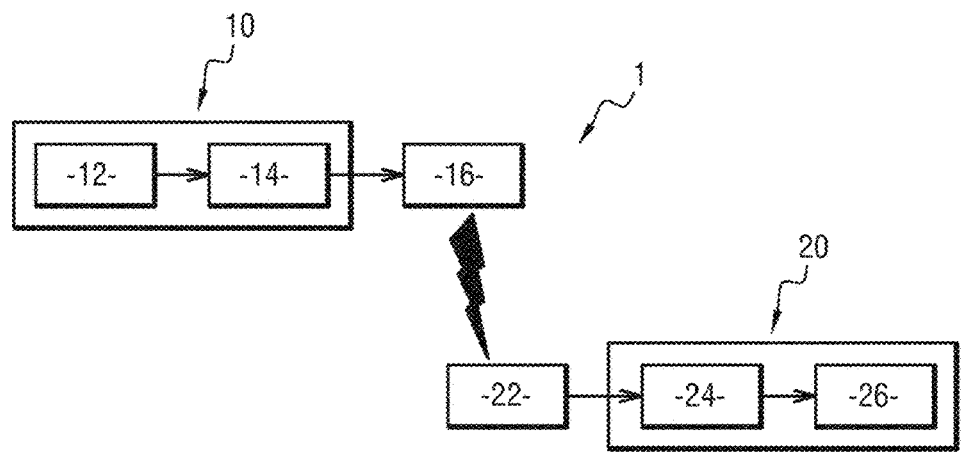
FIG. 1 schematically illustrates the main modules of an image processing system in which the invention is implemented.

FIG. 1 schematically illustrates an image processing system 1, comprising a first image acquisition portion 10 and a second acquired images exploitation portion 20.

In the case of satellite acquisition, the first portion 10 is implemented on board a satellite, while the second portion 20 is for example implemented in a ground image processing center.

The first acquisition portion 10 includes an image acquisition device 12, having an associated acquisition instrumental noise.

For example, the image acquisition device 12 includes a plurality of image detector strips affixed on a satellite. This device acquires images during a scroll of the satellite over a landscape, by pushbroom. In one embodiment, the image acquisition device 12 is of the multispectral type and enables the acquisition of multispectral images in several different narrow spectral bands, as well as a panchromatic image with a broad spectral band, having a spatial resolution higher than the multispectral images.

Alternatively, the image acquisition device is of the array type comprising an array of CCD or CMOS detectors.

Thus, the image acquisition device 12 allows acquiring at least one digital image.

A digital image composed of one or several array(s) of image samples or pixels, each image sample having an associated radiometry value. This domain of representation is called spatial domain. The spatial resolution of a digital image is defined by the number of pixels per row and column of the representation array.

Preferably, the image acquisition device 12 is adapted to acquire images in a plurality of spectral bands, or color images, formed of as many pixel arrays as acquisition spectral bands.

Afterwards, the acquired initial digital image undergoes a compression according to a given compression method, performed by the compression module 14, and the digital data relating to the compressed digital image are stored, for example in a file, and/or transmitted for subsequent exploitation.

There are several known and standardized compression methods, for example JPEG or JPEG2000 for fixed images. Each compression standard implements a transformation of the digital image, hereinafter called a compression transformation. For example, JPEG implements a discrete cosine transform or DCT by blocks, JPEG2000 implements a wavelet transform or DWT by sub-bands.

The first acquisition portion 10 is connected to a transmission module 16, adapted to transmit digital data to the second portion 20 for receiving and exploiting the acquired digital images. For example, the transmission module 16 performs a radio transmission.

The second portion 20 of the system is connected to a receiving module 22, adapted to receive digital data from the transmission module 16.

The receiving module 22, for example a satellite receiving antenna, is connected to a decompression module 24, adapted to perform a corresponding decompression to obtain an exploitable digital image.

According to an embodiment of the invention, the module 24 performs a decompression with restitution of the acquisition instrumental noise, allowing obtaining an intermediate digital image.

For example, the instrumental noise restitution for images having undergone a compression described in the patent application FR 3,025,640 is applied.

In one embodiment, the decompression module 24 performs a standard decompression, and the instrumental noise restitution is performed subsequently by the image restoration module 24 with or without knowledge of the applied compression/decompression method. The instrumental noise restitution uses a noise model that is also used by the image restoration module 26.

The restoration module 26 implements a method for restoring digital images according to the invention.

According to one variant, the compression 14 and decompression 24 modules are optional, the image restoration module 26 nonetheless performing an instrumental noise restitution on the digital image to be restored.

Hence, the intermediate digital image is a digital image in the spatial domain, obtained by restitution of instrumental noise on the digital image to be restored.

The digital image to be restored is obtained either by application of a compression to the acquired initial image to obtain a compressed initial image, then a decompression of the compressed initial image, or it simply consists of the acquired initial digital image.

Figure 2:
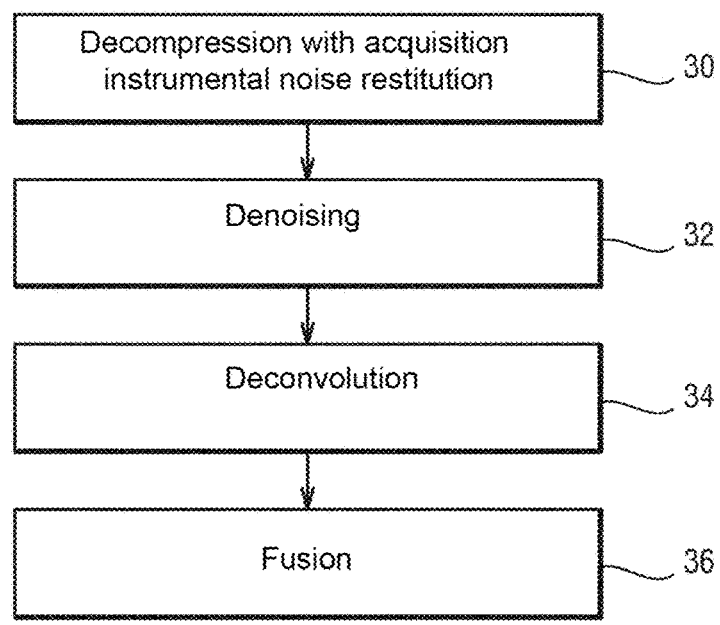
FIG. 2 is a block diagram of the main modules of a restoration device according to one embodiment.

FIG. 2 is a block diagram of the modules implemented by the restoration module 26 according to one embodiment.

The restoration module 26 is adapted to implement the obtainment 30 of an intermediate digital image by decompression with restitution of the acquisition instrumental noise, the denoising 32 on the intermediate digital image to obtain a denoised intermediate digital image and the deconvolution 34, optionally followed by a fusion 36 in the case of multispectral images processing, of the denoised digital image to obtain a final restored digital image.

Detailed embodiments of the decompression with restitution of the acquisition instrumental noise, the denoising and the deconvolution/fusion will be described hereinafter.

Such an image restoration module 26 is for example implemented by a set of computer program instructions executable by a programmable device.

Figure 3:
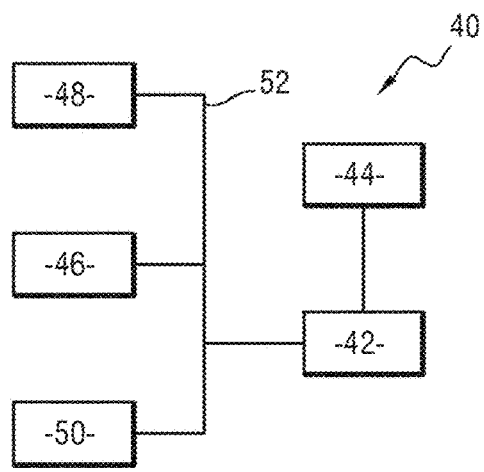
FIG. 3 is a diagram representing the functional blocks of a programmable device capable of implementing the invention.

FIG. 3 schematically illustrates the main functional blocks of a programmable device, for example a computer, a workstation, adapted to implement a restoration method according to the invention.

A programmable device 40 adapted to implement the method of the invention comprises a central processing unit 42, for example a processor (CPU), adapted to execute preprogrammed operations or computer program instructions when the device 40 is turned on.

In one embodiment, a multi-processor central processing unit is used, allowing performing parallel computations. The device 40 also includes information storage means 44, for example registers, adapted to store executable code instructions allowing the implementation of programs including code instructions adapted to implement the method according to the invention.

The device 40 includes control means 46 allowing updating parameters and receiving commands from an operator. When the programmable device 40 is an embedded device, the control means 46 comprise a telecommunication device allowing receiving remote commands and parameter values.

Alternatively and optionally, the control means 46 consist of means for inputting commands from an operator, for example a keyboard.

Optionally, the programmable device 40 comprises a screen 48 and an additional pointing means 50, such as a mouse.

The various functional blocks of the device 40 described hereinabove are connected via a communication bus 52.

Alternatively, the methods of the invention are implemented by graphic processors or GPU, with a parallelized hardware architecture.

Alternatively, the methods of the invention are implemented by electronic devices of the programmable logic circuit type, such as electronic cards based on FPGA or ASIC, or chips that can be integrated into electronic devices such as mobile phones or cameras.

Figure 4:
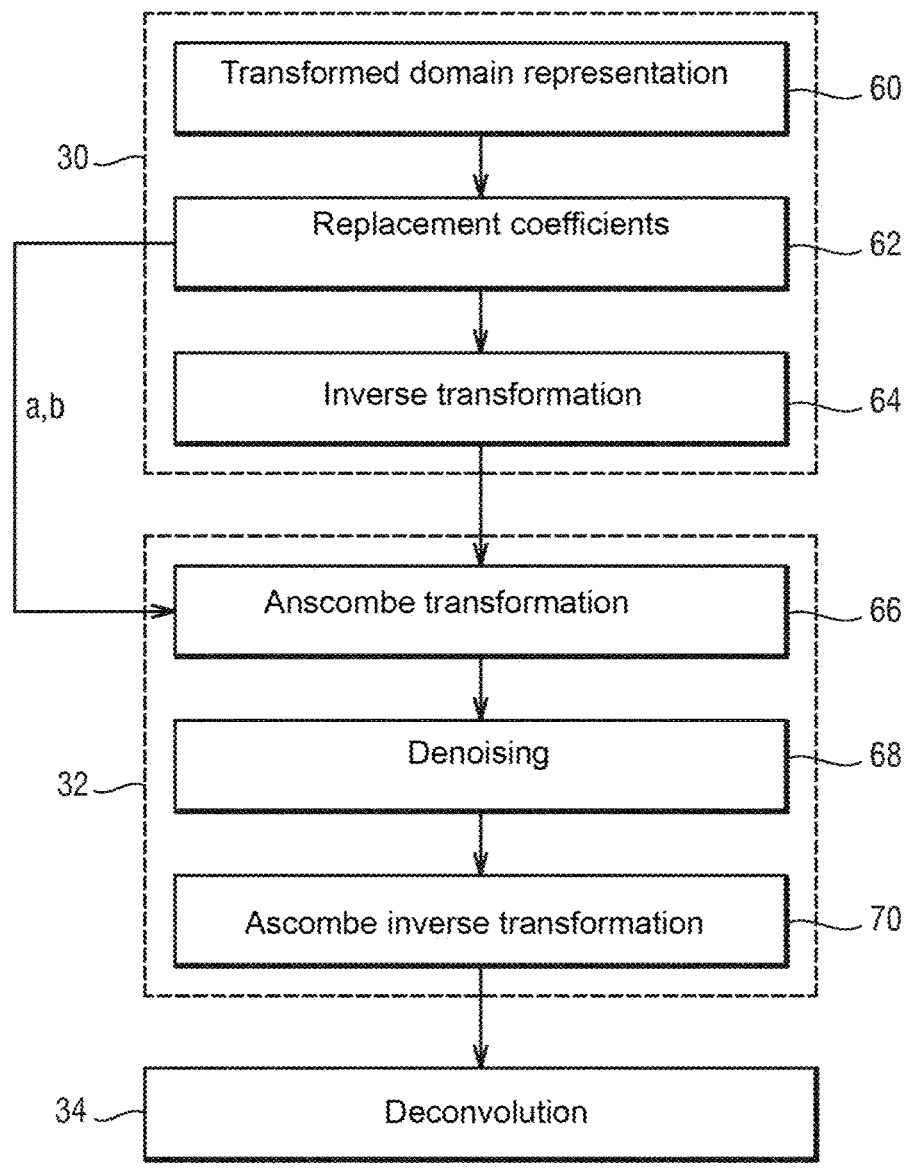
FIG. 4 is a block diagram of the main steps of a restoration method according to a first embodiment of the invention.

FIG. 4 is a block diagram of the main steps of a digital image restoration method in a first embodiment of the invention.

As input, the method receives an input digital image that corresponds to the digital image to be restored after compression.

The first decompression step 30 with acquisition instrumental noise restitution is divided into three sub-steps 60, 62, 64.

During the first step 60, a representation of the input digital input image is obtained in the domain of the compression transformation, also called the transformed domain.

It should be noted that the input digital image may be a digital image represented in the spatial domain, or be provided in an encoded representation after compression.

When the input digital image is represented in the spatial domain, the corresponding compression transformation, for example DCT or DWT, is applied to obtain a representation of the image by coefficients blocks in the transformed domain.

When the input digital image is represented by compressed data, a decoding is applied according to the used compression standard, to obtain a representation of the image by coefficients blocks, called representation in the transformed domain.

When the input digital image is represented in the spatial domain, the input digital image may be derived from a compression followed by a decompression, but the compression/decompression method is not known from the input digital image. In this case, a selected compression transformation is applied at step 60, for example a block DCT or a wavelet transformation on a selected number of decomposition levels. In this case, the applied compression transformation is selected at step 60, and not as a function of the compression/decompression method previously applied to the initial image that is not known at this stage.

Step 60 is followed by a step 62 of modifying the coefficients according to a threshold value calculated according to a parameterized model of the acquisition instrumental noise.

Preferably, the parameterized model of the instrumental noise defines the noise standard deviation σ by:

$$\sigma = \sqrt{a^2 + b \cdot s} \qquad (EQ\ 1)$$

where a and b are coefficients of said instrumental noise model and s is a coefficient value in the transformed domain representative of the average of the sample values of a processed block of the digital image.

For example, s is the coefficient DC of the processed block when the compression transformation is a DCT per block, and s is the low frequency wavelet coefficient spatially corresponding to the processed block for a discrete wavelet transformation DWT.

According to another variant and in the case of a compressor based on the discrete wavelet transformation DWT, the denoising is refined by applying it at each step of the wavelet coefficients re-composition, for each re-composition level, the value s then representing the low frequency coefficient of the considered re-composition level and the denoising concerning the wavelet coefficients belonging to the three high frequency sub-bands corresponding to the low frequency sub-band of the considered re-composition level. When the acquisition device is known, the values of the coefficients a and b are known and stored prior to the implementation of the method.

For example, for the PLEIADES-1A satellite with a 13-stage configuration TDI, the panchromatic band values a and b in the spatial domain are respectively equal to 2.267 and 0.0393 for a signal s expressed in «digital count». These values are adapted, where appropriate, as a function of the compression transformation for the use of the noise model in the transformed domain, as explained hereinabove.

In the case of a multispectral image acquisition, a pair of values (a, b) is estimated and stored for each acquisition spectral band.

Alternatively, the values of the coefficients a and b are provided by an operator, or estimated from one or several image(s) acquired by a given acquisition device or from one or several arbitrary image(s).

The noise threshold $S_{noise}$ is defined as a function of a noise proportionality factor $K_d$, and a reconstruction proportionality factor $K_r$.

The noise threshold $S_{noise}$ is obtained from the standard deviation σ of the acquisition noise:

$$S_{noise} = K_d \cdot \sigma \qquad (EQ2)$$

where $K_d$ is the constant noise proportionality factor provided by the user.

$K_d$ may be typically 0.5 or 1, and more generally be comprised between 0 and 3.

More generally, the noise threshold $S_{noise}$ is obtained by applying a function f( ), which is not necessarily linear:

$$S_{noise} = f(K_d, \sigma) \qquad (EQ3)$$

For each block of the considered transformed domain, the absolute value of each coefficient denoted $C_{i,j}$ of the processed block is compared with the noise threshold $S_{noise}$. When the absolute value of the coefficient $C_{i,j}$ is higher than the noise threshold, it is left unchanged. When the absolute value of the coefficient $C_{i,j}$ is lower than the noise threshold $S_{noise}$, the coefficient $C_{i,j}$ is replaced with a local noise value which is a function of the value representative of the acquisition noise model associated with the processed block. Generally, one can set out $C'_{i,j} = g(K_r, \sigma)$.

For example, the function go is given by:

$$C'_{i,j} = \text{sign}(C_{i,j}) \cdot K_r \cdot \sigma \cdot |rand| \qquad (EQ\ 4)$$

where:

sign($C_{i,j}$) is the sign of the coefficient $C_{i,j}$;

$K_r$ is the reconstruction proportionality factor, which is typically 1 but may be more generally comprised between 0 and 3, rand is a value obtained by pseudo-random drawing according to a predetermined distribution law, for example Gaussian, of variance equal to 1. The absolute value of the value rand, denoted |rand|, is used in the formula of the equation (EQ 4).

Preferably, all the coefficient blocks of the transformed digital image are processed.

Afterwards, at an inverse transformation application step 64, the inverse compression transformation is applied to obtain an intermediate digital image.

Advantageously, this intermediate digital image no longer presents compression artifacts, but presents acquisition instrumental noise artifacts similar to those introduced by the image acquisition device. In other words, the image at the processing output has a noise having the same characteristics as the instrumental noise present in the image before compression.

The first decompression step 30 with restitution of the instrumental noise is followed by a denoising step 32 applied to the intermediate image.

The denoising step 32 includes the sub-steps 66 to 68.

The sub-step 66 consists in applying a variance stabilization transformation, which is preferably the Anscombe transformation, to the intermediate image previously obtained. A stabilized intermediate image is then obtained.

According to possible variants, other variance stabilization transformations, for example the Freeman-Tukey transformation, are applicable.

The Anscombe transformation is parameterized by two coefficients a, b. Advantageously, the value of the coefficients (a, b) defining the applied Anscombe transformation is the same as that of the coefficients of the observed instrumental noise model.

The Anscombe transformation, applied in the spatial domain, is defined by:

$$A(p) = \frac{2}{b} \cdot \sqrt{bp + \frac{3}{8}b^2 + a^2} \quad \text{(EQ 5)}$$

Where a and b are coefficients, with the same value as the coefficients of the acquisition instrumental noise model defined hereinabove, in the spatial domain, and p is the radiometry value of a processed pixel.

As mentioned hereinabove, in the case of a multispectral acquisition, each spectral band has an associated pair of coefficient values (a, b).

The step 66 of applying the stabilization transformation is followed by a step 68 of applying a stationary noise denoising method, itself followed by a step 70 of applying the stabilization transformation of the inverse variance, to obtain a denoised intermediate digital image.

A stationary noise is a noise whose standard deviation is substantially constant in the image.

The inverse Anscombe transformation is given by:

$$A^{-1}(p) = \frac{1}{4}bp^2 - \frac{3}{8}b - \frac{a^2}{b} \quad \text{(EQ 6)}$$

The denoising step 32 is followed by a deconvolution step 34 to obtain the restored digital image. The deconvolution allows improving the sharpness of the obtained image.

Any known deconvolution method is applicable. For example, a Fourier transform, a Fourier deconvolution filtering, and an inverse Fourier transform are applied.

The used deconvolution filtering is related to the characteristic optical transfer function of the image acquisition device, which is measured and known, in the same way as the parameters a and b of instrumental noise.

As a non-limiting example, the deconvolution method described in the article «technical restoration for Pleiades-HR panchromatic images» by C. Latry et al, published in International Archives of the Photogrammetry, Remote Sensing and Spatial Information Sciences, Volume XXXIX-B1, 2012, can be applied.

Preferably, the stationary noise denoising method applied at step 68 is a nonlocal Bayesian method, such as for example the method described in the article by Marc Lebrun, Antoni Buades, and Jean-Michel Morel, «A Nonlocal Bayesian Image Denoising Algorithm» published in SIAM Journal on Imaging Sciences, Vol. 6, no. 3, pages 1665-1668. The principle of the NL-Bayes method consists in replacing the value p of a pixel p(x, y) with a weighted average of the values of other pixels p' of the processed image, selected based on a criterion of distance between neighborhoods of given size.

Alternatively, other known stationary noise denoising methods, such as for example the method known by the acronym BM3D for «block matching and 3D filtering» or a «deep learning» type learning denoising, are also applicable.

Figure 5:
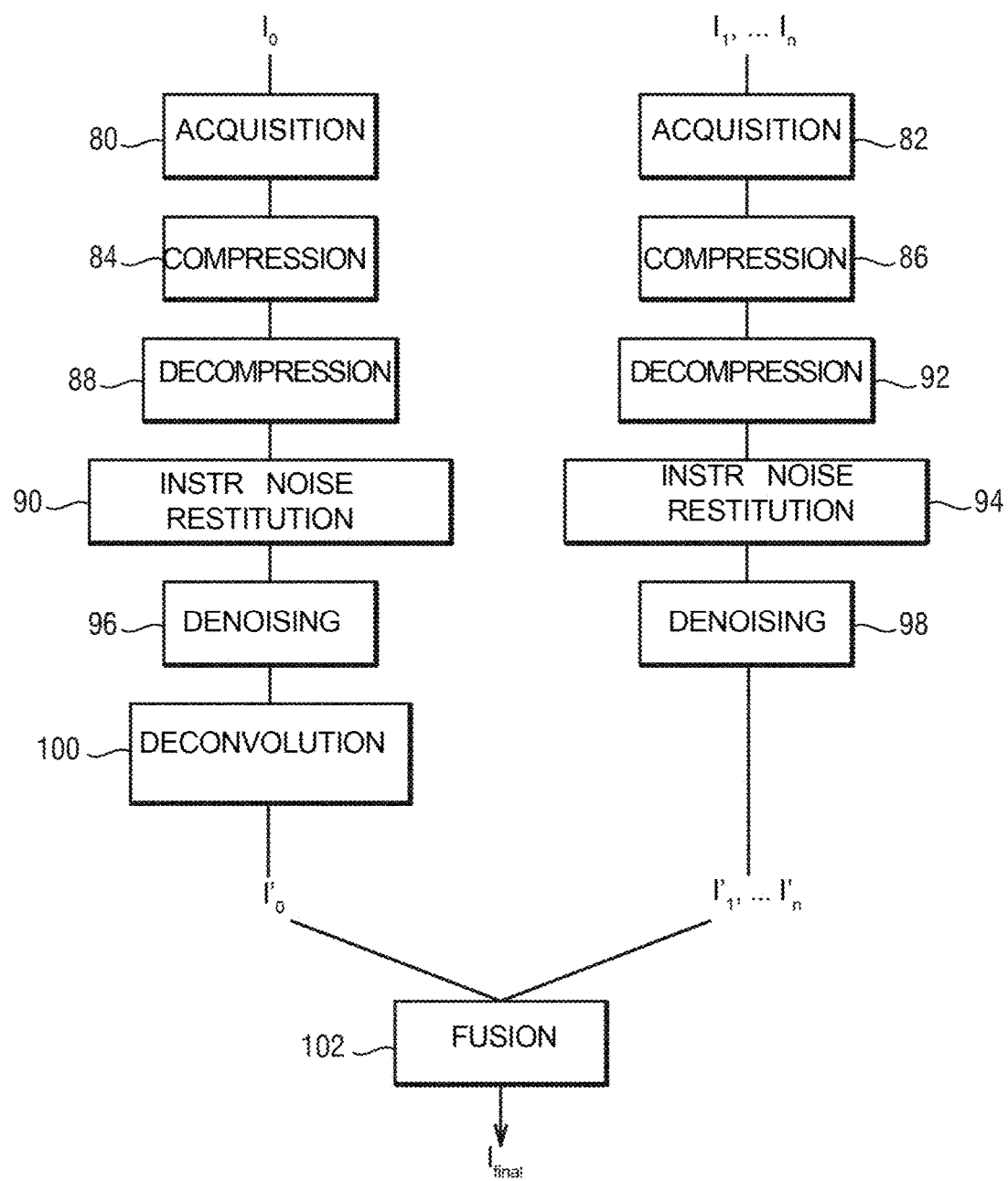
FIG. 5 is a block diagram of the main steps of a restoration method according to a second embodiment of the invention.

FIG. 5 is a block diagram of the main steps of a restoration method according to a second embodiment of the invention, applied particularly to images acquired by satellite.

In this embodiment, the input images are on the one hand the image $I_0$ which is the panchromatic image and n images $I_1$ to $I_n$, each of the images $I_1$ to $I_n$ corresponding to a given acquisition spectral band.

The images $I_1$ to $I_n$ are hereinafter called multispectral images, being understood that each of these images corresponds to a given narrow acquisition spectral band.

The images $I_1$ to $I_n$ have a spatial resolution lower than the spatial resolution of the panchromatic image $I_0$. Typically, the resolution ratio is 4 for satellite imagery.

These images are acquired during the acquisition steps 80, 82.

The image acquisition steps are followed by compression steps 84, 86, according to a predetermined compression method, using a compression transformation as explained hereinabove.

For example, in one embodiment, the acquisition 80, 82 and compression 84, 86 steps are performed onboard a satellite.

These steps 84, 86 are followed by decompression steps 88, 90 with instrumental noise restitution for the panchromatic image $I_0$, and 92, 94 for each of the multispectral images $I_1$ to $I_n$. The decompression with instrumental noise restitution is performed in a similar manner to that described with reference to FIG. 4 for the implementation of step 30.

On completion of the decompression steps with instrumental noise restitution 88, 90, 92, 94, an intermediate panchromatic image $I_{0\_interm}$ and intermediate multispectral images $I_{1\_interm}$ to $I_{n\_interm}$ are obtained.

The decompression with instrumental noise restitution is followed by a denoising step 96 for the intermediate panchromatic image $I_{0\_interm}$ and a denoising step 98 for each intermediate multispectral image $I_{1\_interm}$ to $I_{n\_interm}$.

The respective denoising steps 96, 98 are similar to those described with reference to FIG. 4.

The denoising step 98 comprises, in one embodiment, for each intermediate multispectral image $I_{k\_interm}$, the application of a variance stabilization transformation, for example the Anscombe transformation parameterized with the coefficients a, b of the instrumental noise model for the spectral band associated with $I_k$, then the application of a stationary noise denoising method, and finally the application of the stabilization transformation of the inverse variance.

On completion of the denoising steps 96, 98 we obtain restored multispectral images to $I'_1$ to $I'_n$.

Similarly, the denoising step 96 applied to the intermediate panchromatic image $I_{0\_interm}$ comprises, in one embodiment, the application of a variance stabilization transformation, for example the Anscombe transformation parameterized with the coefficients a, b of the instrumental noise model for the panchromatic band, then the application of a stationary noise denoising method, and finally the application of the stabilization transformation of the inverse variance.

The denoising step 96 is followed by a deconvolution step 100, which allows obtaining a restored panchromatic image $I'_0$.

Finally, steps 98 and 100 are followed by a step 102 of merging all or part of the restored images $I'_0$, $I'_1$ to $I'_n$.

Preferably, the multiresolution image fusion method described in the French patent published under the number FR2994007 of S. Fourest and C. Latry is applied.

Alternatively, another multiresolution image fusion method known to those skilled in the art may be applied.

A restored color final image, $I_{final}$, is obtained whose visual quality is improved compared to an image obtained by a conventional compression/decompression, restoration and fusion method.

According to a variant of the embodiment of FIG. 5, the deconvolution step 100 is also applied to each of the multispectral images resulting from the denoising steps 98, similarly to the application of the deconvolution after the denoising step 96, so as to improve the sharpness of the multispectral images.

Advantageously, the application of a variance stabilization transformation allows transforming the restituted instrumental noise on the images into a noise whose variance is independent of the image signal, which enables the use of a stationary noise denoising algorithm.

The invention claimed is:

1. A method for restoring a digital image, the digital image to be restored being derived from an initial image acquired by an image acquisition device having an associated acquisition instrumental noise, the method including the steps of:
    obtaining an intermediate digital image with restitution of the associated acquisition instrumental noise;
    denoising the intermediate digital image to obtain a denoised intermediate digital image; and
    deconvoluting the denoised intermediate digital image to obtain a restored digital image, wherein the step of obtaining an intermediate digital image comprises substeps of:
    obtaining, by applying a transformation called compression transformation, of a representation of the digital image to be restored by a plurality of coefficient blocks, each coefficients block of the plurality of coefficient blocks corresponding to a pixels block of the digital image to be restored;
    for at least one processed coefficient of a coefficients block:
    calculating a noise threshold as a function of a value representative of an image acquisition instrumental noise model;
    comparing an absolute value of the at least one processed coefficient to the noise threshold; and
    when the absolute value of the at least one processed coefficient is higher than or equal to the noise threshold, the at least one processed coefficient is left unchanged,
    when the absolute value of the at least one processed coefficient is lower than the noise threshold, replacing the absolute value of the at least one processed coefficient with a noise value depending on the value representative of the image acquisition noise model.

2. A method for restoring a digital image, the digital image to be restored being derived from an initial image acquired by an image acquisition device having an associated acquisition instrumental noise, the method including the steps of:
    obtaining an intermediate digital image with restitution of the associated acquisition instrumental noise;
    denoising the intermediate digital image to obtain a denoised intermediate digital image;
    deconvoluting the denoised intermediate digital image to obtain a restored digital image;
    wherein the associated acquisition instrumental noise is modeled by a model parameterized by two coefficients, the two coefficients having values used during the restitution of the associated acquisition instrumental noise, and wherein the denoising step includes the application of a stabilization transformation of a parameterized variance by the two coefficients characterizing a parameterized model of the associated acquisition instrumental noise to provide a variance stabilization; and
    wherein the denoising step includes the following substeps of:
    applying the variance stabilization transformation to obtain a stabilized intermediate image;
    applying a stationary noise denoising method on the stabilized intermediate image; and
    applying an inverse transformation of the variance stabilization transformation on the digital image resulting from the step of denoising the intermediate digital image to obtain a denoised intermediate digital image.

3. The method for restoring a digital image according to claim 1, wherein the digital image to be restored has been obtained by applying a compression to the initial image acquired by the image acquisition device to obtain a compressed initial image, and then a decompression of the compressed initial image.

4. The method for restoring a digital image according to claim 3, wherein the restitution of the associated acquisition instrumental noise is performed in connection with the decompression of the compressed initial image.

5. The method for restoring a digital image according to claim 1, wherein the digital image to be restored is a multispectral image composed of a plurality of acquired images in different spectral bands and wherein the steps of obtaining an intermediate digital image and of denoising the intermediate digital image are applied to each of the plurality of acquired images in different spectral bands, and the deconvolution step is applied to at least one intermediate digital images obtained from the plurality of acquired images.

6. The method for restoring a digital image according to claim 5, further including an image fusion step applied after denoising or after deconvolution, to obtain a final restored image.

7. The method for restoring a digital image according to claim 2, wherein the digital image to be restored is a multispectral image composed of a plurality of acquired images in different spectral bands, and wherein the values of the two coefficients of the model depend on an acquisition spectral band and are determined for each acquisition spectral band.

8. The method for restoring a digital image according to claim 2, wherein the variance stabilization transformation is an Anscombe transformation.

9. The method for restoring a digital image according to claim 1, wherein the associated acquisition instrumental noise is modeled by a parameterized model defining a noise standard deviation $\sigma$ by $\sigma = \sqrt{a^2 + b \cdot s}$, where a and b are coefficients of the parameterized model and s is a coefficient value representative of an average of values associated with pixels of a pixels block of the digital image.

10. A computer program product, comprising: a non-transitory computer readable storage medium having program instructions for implementing the steps of a method for restoring a digital image according to claim 1 during execution of the computer program product by a processor of a programmable device.

11. The method for restoring a digital image according to claim 3, wherein the digital image to be restored is a multispectral image composed of a plurality of acquired images in different spectral bands and wherein the steps of obtaining an intermediate digital image and of denoising the intermediate digital image are applied to each of the plurality of acquired images in different spectral bands, and the deconvolution step is applied to at least one intermediate digital image obtained from the plurality of acquired images.

12. The method for restoring a digital image according to claim 4, wherein the digital image to be restored is a multispectral image composed of a plurality of acquired images in different spectral bands and wherein the steps of obtaining an intermediate digital image and of denoising the intermediate digital image are applied to each of the plurality of acquired images in different spectral bands, and the deconvolution step is applied to at least one intermediate digital image obtained from the plurality of acquired images.

13. The method for restoring a digital image according to claim 12, further including an image fusion step applied after denoising or after deconvolution, to obtain a final restored image.

14. The method for restoring a digital image according to claim 13, wherein the acquisition instrumental noise is modeled by a model parameterized by two coefficients, the two coefficients having values used during the restitution of the associated acquisition instrumental noise, and wherein the denoising step includes the application of a stabilization transformation of a parameterized variance by the two coefficients characterizing a parameterized model of the associated acquisition instrumental noise.

15. The method for restoring a digital image according to claim 14, wherein the digital image to be restored is a multispectral image composed of a plurality of acquired images in different spectral bands, and wherein values of the two coefficients depend on the different spectral bands and are determined for each different spectral band.

16. The method for restoring a digital image according to claim 15, wherein the denoising step includes the following sub-steps of:
    applying the variance stabilization transformation to obtain a stabilized intermediate image,
    applying a stationary noise denoising method on the stabilized intermediate image,
    applying an inverse transformation of the variance stabilization transformation on a denoised intermediate digital image resulting from the step of applying a denoising method to obtain the denoised intermediate digital image.

\* \* \* \* \*